United States Patent
Di Biase

(10) Patent No.: US 12,349,622 B2
(45) Date of Patent: Jul. 8, 2025

(54) RADIO-CONTROLLED VEHICLE FOR PERFORMING GROUND WORK

(71) Applicant: MDB SRL, Lanciano (IT)

(72) Inventor: Mario Di Biase, Lanciano (IT)

(73) Assignee: MDB SRL (IT)

(*) Notice: Subject to any disclaimer, the term of this patent is extended or adjusted under 35 U.S.C. 154(b) by 888 days.

(21) Appl. No.: 17/496,982

(22) Filed: Oct. 8, 2021

(65) Prior Publication Data
US 2022/0151145 A1 May 19, 2022

(30) Foreign Application Priority Data
Oct. 8, 2020 (IT) .......................... 102020000023716

(51) Int. Cl.
| | |
|---|---|
| A01D 34/00 | (2006.01) |
| A01D 34/64 | (2006.01) |
| A01D 34/76 | (2006.01) |
| A01D 34/81 | (2006.01) |
| A01D 69/00 | (2006.01) |
| A01D 69/02 | (2006.01) |
| A01D 69/03 | (2006.01) |

(52) U.S. Cl.
CPC .......... *A01D 34/008* (2013.01); *A01D 34/76* (2013.01); *A01D 34/81* (2013.01); *A01D 69/00* (2013.01); *A01D 69/02* (2013.01); *A01D 69/03* (2013.01)

(58) Field of Classification Search
CPC ........................ A01D 34/008; A01D 69/00–03
See application file for complete search history.

(56) References Cited

U.S. PATENT DOCUMENTS

| | | | |
|---|---|---|---|
| 4,819,508 A | | 4/1989 | Yamaoka |
| 5,042,238 A | * | 8/1991 | White, III ................ B62D 9/00 280/211 |
| 5,077,959 A | | 1/1992 | Wenzel |
| 5,127,215 A | * | 7/1992 | Wenzel .............. A01D 34/6806 56/11.1 |
| 7,416,040 B2 | | 8/2008 | Dvorak |
| 7,665,283 B2 | | 2/2010 | Turner |
| 2008/0034721 A1 | | 2/2008 | Waesche |
| 2010/0106344 A1 | | 4/2010 | Edwards |

FOREIGN PATENT DOCUMENTS

| | | | | |
|---|---|---|---|---|
| GB | 2230414 A | * | 10/1990 | .......... A01D 34/008 |
| GB | 2358843 A | * | 8/2001 | .......... A01D 34/008 |
| WO | WO-03083594 A1 | * | 10/2003 | .......... A01D 34/008 |
| WO | WO-2017125089 A1 | * | 7/2017 | .......... A01B 39/085 |

* cited by examiner

*Primary Examiner* — Christopher J Sebesta
*Assistant Examiner* — Ashley A Kaercher
(74) *Attorney, Agent, or Firm* — The Belles Group, P.C.

(57) ABSTRACT

A radio-controlled vehicle, in particular a radio-controlled lawn mower, comprising: a frame; an engine; at least one rolling unit to cause the radio-controlled vehicle, in use, to move on a ground; a drive system for each rolling unit; a remote control; a control unit, which exchanges signals with the remote control, the engine and each drive system; a belt drive assembly which is interposed between the engine and each drive system and is operated by the engine so as to cause the rotation of each drive system.

11 Claims, 9 Drawing Sheets

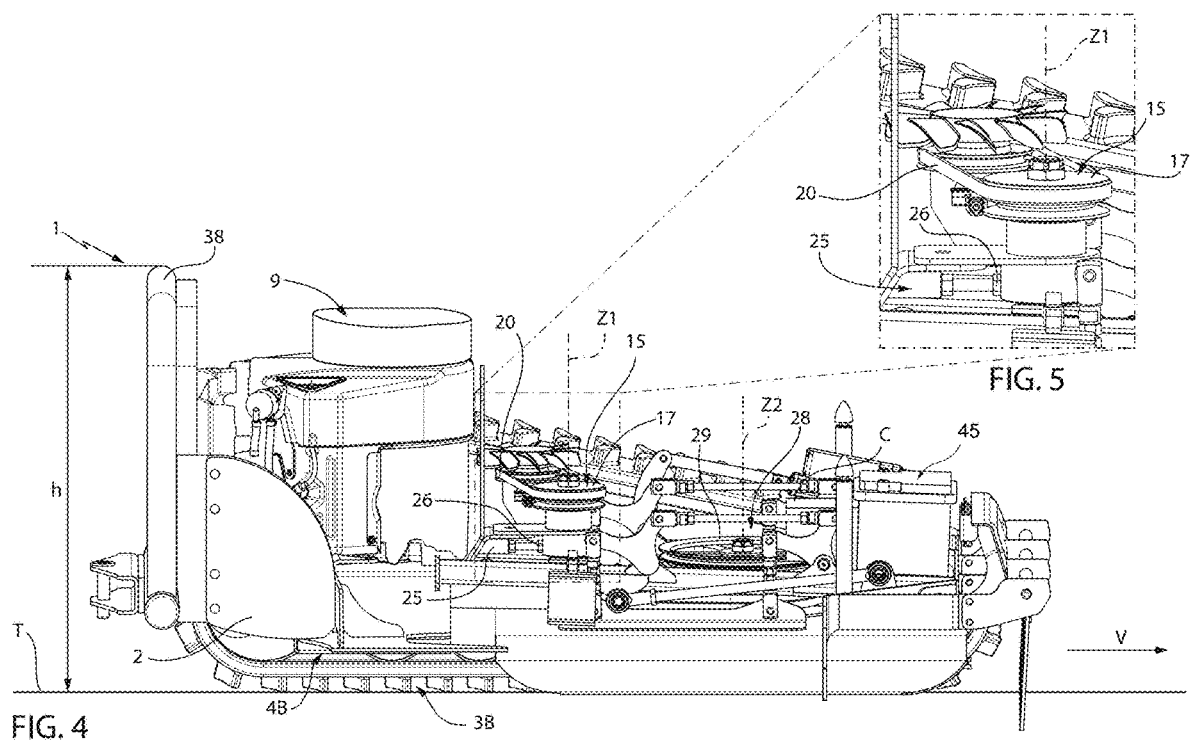

RADIO-CONTROLLED VEHICLE FOR PERFORMING GROUND WORK

CROSS-REFERENCE TO RELATED APPLICATIONS

This Patent Application claims priority from Italian Patent Application No. 102020000023716 filed on Oct. 8, 2020, the entire disclosure of which is incorporated herein by reference.

TECHNICAL FIELD

The present patent application relates to a radio-controlled vehicle, in particular to a lawn mower of the radio-controlled type, for performing ground work, for example for cutting grass, shrubs and bushes.

In particular, the present invention relates to a compact radio-controlled vehicle, i.e. which has a reduced height (the overall size along an axis that is perpendicular to a supporting surface), so as to be able to carry out ground work also underneath structures, for example underneath low photovoltaic panels, i.e. which have a low passage area for the radio-controlled vehicle, i.e. with a height from the ground also lower than one metre.

BACKGROUND ART

Advantageously, a radio-controlled vehicle does not require the presence of the operator on the vehicle during the work. Therefore, the use of a radio-controlled vehicle allows working, for example mowing, also arduous grounds, such as very steep slopes (for example above 60°), without endangering the operator who, instead of being on board the vehicle, controls it remotely.

Known radio-controlled vehicles, in particular known radio-controlled lawn mowers, comprise: an engine assembly; a frame for supporting the engine assembly; two rolling units (tracks or wheels) placed on the sides of the frame for moving the radio-controlled vehicle on the ground; and a hydraulic assembly connected to the engine assembly for operating each rolling unit. The hydraulic assembly generally comprises at least one hydraulic pump, a tank, filters and a plurality of ducts by means of which the hydraulic assembly is connected to each rolling unit in order to operate it.

The radio-controlled vehicles of the type described above have a fairly large number of components, and are therefore heavy and bulky, which makes it difficult to use such vehicles on arduous and very steep grounds. All the more so, the known radio-controlled vehicles of the type described above are not suitable for crossing low passage areas (with a height from the ground also lower than one metre).

Moreover, the vehicles of this type require periodic maintenance, in particular on the components of the hydraulic assembly.

Another known type of radio-controlled vehicle is the so-called radio-controlled hybrid vehicle. A known radio-controlled hybrid vehicle comprises: a frame; an internal combustion engine supported by the frame and connected to a dynamo that generates electric energy; two undercarriages arranged on the sides of the frame, each comprising a rolling unit (for example a track or a plurality of wheels) for moving the vehicle on the ground and a lateral electric engine for operating the rolling unit; two control units, each adapted to control one of the two lateral electric engines; and a plurality of electric cables configured to connect the dynamo to each control unit and to then connect the control unit to the corresponding lateral electric engine so as to operate the rolling unit.

A vehicle constructed in this manner is, however, quite complex from an electronic standpoint and has a large number of electric connections, consequently it has assembling and maintenance difficulties, besides having high costs and being very bulky. Also in this case, the known radio-controlled vehicles of the type described above are unsuitable for passing through low passage areas.

DISCLOSURE OF INVENTION

An object of the present invention is to provide a radio-controlled vehicle, in particular a lawn mower, which is able to pass through low passage areas, i.e. with a height also lower than one metre.

An object of the present invention is to provide a radio-controlled vehicle of an improved type which overcomes at least in part the drawbacks indicated above.

A further object of the present invention is to provide a compact and light radio-controlled vehicle.

A further object of the present invention is to provide a radio-controlled vehicle whose maintenance is easy and, at the same time, which requires a reduced number of maintenance interventions.

A further object of the present invention is to provide a radio-controlled vehicle which allows working grounds also with steep slopes in conditions of the utmost safety and stability.

According to the present invention, a radio-controlled vehicle, in particular a radio-controlled lawn mower, is provided according to what specified in claim 1 and, preferably, in any one of the subsequent claims directly or indirectly dependent on claim 1.

BRIEF DESCRIPTION OF THE DRAWINGS

The invention will now be described with reference to the accompanying drawings, which illustrate a non-limiting example embodiment thereof, wherein:

FIG. 4 is a side view of the vehicle of FIG. 1 with some parts removed for the sake of clarity;

FIG. 5 is a view on an enlarged scale of a detail of FIG. 4;

BEST MODE FOR CARRYING OUT THE INVENTION

Figure 1:
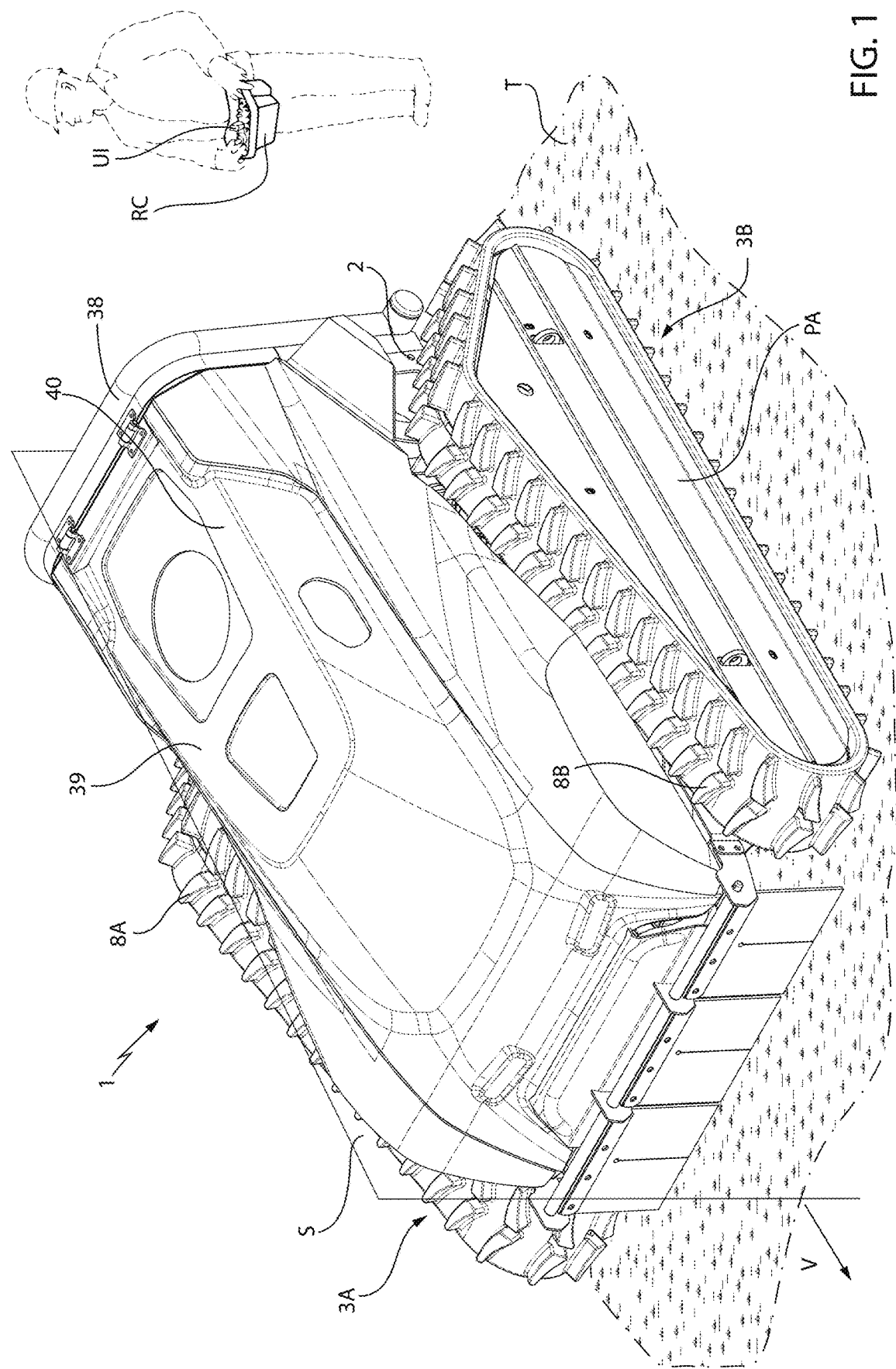
FIG. 1 is a perspective view of a radio-controlled vehicle according to an embodiment of the present invention.

In the accompanying figures, reference numeral 1 indicates, as a whole, a radio-controlled vehicle. Advantageously, the radio-controlled vehicle 1 is of compact type, i.e. it has a height (the overall size along an axis that is perpendicular to the ground T) lower than one metre.

As illustrated in greater detail in the following, advantageously, the radio-controlled vehicle 1 has a height lower than one metre. Preferably, the radio-controlled vehicle 1 has a height lower than 80 centimetres. This way, the radio-controlled vehicle 1 is able to carry out works also underneath pre-existing structures with low passage areas, i.e. with a height from the ground T also below one metre, such as for example underneath photovoltaic panels.

In the following description, the radio-controlled vehicle 1 will be explicitly referred to as a radio-controlled lawn mower configured to cut grass, shrubs and bushes of a ground T, without thereby losing generality.

In the following, the terms such as height, front, back, left and right, upper and lower are used with reference to the radio-controlled lawn mower 1, which has a longitudinal axis X, also known as roll axis, and which moves, in use, on a ground T in a direction of travel V.

In order to distinguish between two substantially identical components, the reference numerals used in the following for the components on the right of the longitudinal symmetry plane of the radio-controlled lawn mower 1 (i.e. of the vertical longitudinal reference plane S which contains the longitudinal axis X and is perpendicular to the ground T) are designated by the suffix A; while the reference numerals of the components on the left are designated by the suffix B.

Figure 2:
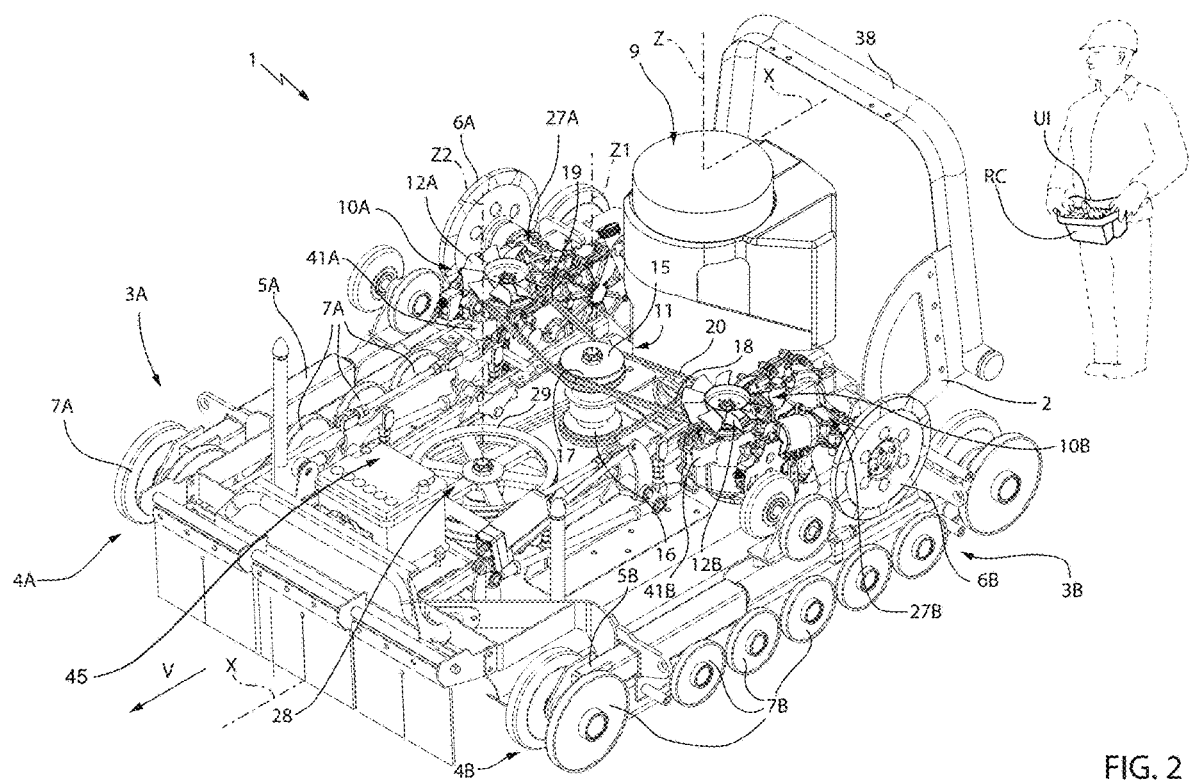
FIG. 2 is a perspective view of the vehicle of FIG. 1 with some parts removed for the sake of clarity.

The radio-controlled lawn mower 1 comprises a remote control RC and a control unit C installed on board the radio-controlled lawn mower 1 (see, for example, FIGS. 2 and 4). The control unit C being configured to exchange signals, preferably in a wireless mode, with the remote control RC. Advantageously, the remote control RC comprises a user/operator interface UI (for example, a display or a joystick system as in analogous systems) by means of which a user/operator can exchange input and/or output data with said control unit C, as will be illustrated in greater detail in the following (and as illustrated schematically in FIGS. 1 and 2).

According to what illustrated at least in FIGS. 1, 2, 4, 7 and 8, the radio-controlled lawn mower 1 comprises a frame 2 and two rolling units 3A and 3B, which are arranged on the sides of the frame 2 (in particular, respectively on the right and on the left of the vertical longitudinal reference plane S) and which support the frame 2.

Each rolling unit 3A and 3B is configured to keep the respective side of the frame 2 raised off the ground T and to allow the movement of the frame 2 on the ground T.

According to some advantageous but non-limiting embodiments such as the one illustrated in the accompanying figures, the rolling units 3A, 3B are of the track type. This advantageously allows using the radio-controlled lawn mower 1 on any type of ground T. According to alternative embodiments not illustrated, the rolling units 3A, 3B can comprise systems with wheels instead of the tracks 8A and 8B.

Specifically, according to what illustrated in the accompanying figures (see in particular FIG. 2), the radio-controlled lawn mower 1 comprises a right undercarriage 4A and a left undercarriage 4B connected to the frame 2, each having a support rod 5A and 5B.

With particular reference to FIGS. 1, 2, 6, 7, and 8, each rolling unit 3A and 3B is a tracked undercarriage comprising a drive wheel 6A and 6B and a plurality of transmission wheels 7A, 7B. The drive wheel 6A and 6B and the transmission wheels 7A, 7B of each rolling unit 3A and 3B are connected to the respective support rod 5A and 5B in a known manner and can rotate around a transverse axis substantially perpendicular to the vertical longitudinal reference plane S.

Each rolling unit 3A and 3B further comprises a track 8A and 8B, which is fitted around the respective transmission wheels 7A, 7B and the respective drive wheel 6A and 6B and can be operated by the drive wheel 6A and 6B, which meshes with the track 8A and 8B. The track 8A and 8B has a closed belt body and comprises an outer surface which, in use, comes into contact with the ground T, and an inner surface which, in use, comes into contact with the transmission wheels 7A, 7B and with the drive wheel 6A and 6B. Each undercarriage 4A and 4B further comprises a respective lateral closing wall PA (see in particular FIG. 1) configured to insulate the rolling unit 3A and 3B with respect to the outside in order to protect it from external blows and prevent the risk that dirt or elements from the outside, for example branches, shrubs, etc., can get caught in one of the (or in both the) rolling units 3A and 3B, compromising the operation thereof.

It is understood that, according to alternative embodiments not illustrated, the radio-controlled lawn mower 1 could comprise a single rolling unit, for example placed in the rear part of the lawn mower 1, and one or more pivoting wheels, for example placed in the front part of the lawn mower 1, instead of the rolling units 3A and 3B.

Figure 3:
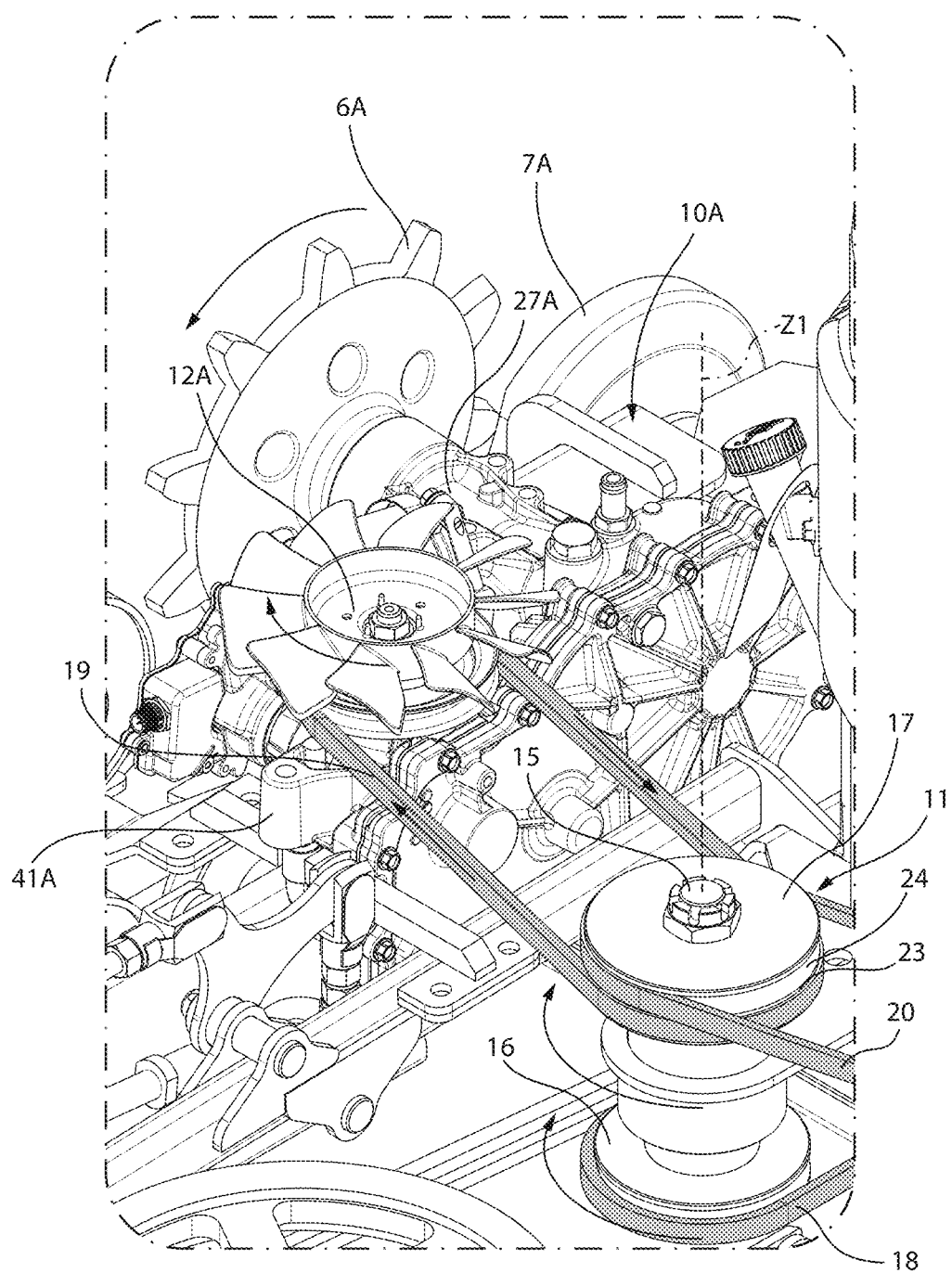
FIG. 3 is a view on an enlarged scale of a detail of FIG. 2.
Figure 6:
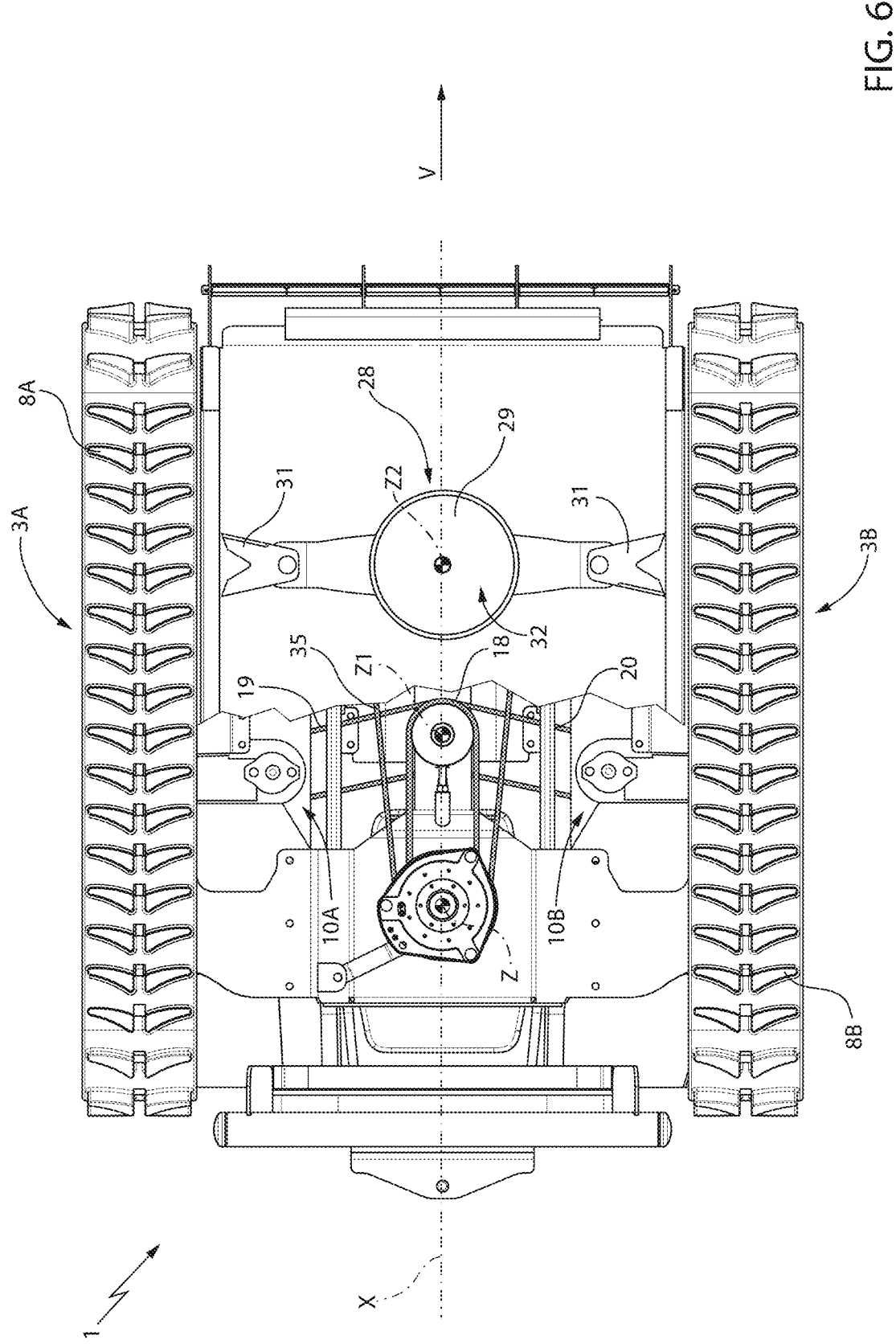
FIG. 6 is a bottom view of the vehicle of FIG. 1.

The radio-controlled lawn mower 1 further comprises a central internal combustion engine 9 and two lateral drive systems 10A, 10B independent of one another and configured to operate, respectively, the right rolling unit 3A and the left rolling unit 3B; in particular, the right drive wheel 6A and the left drive wheel 6B (see, for example, FIGS. 2 and 3).

Advantageously, the internal combustion engine 9 is arranged in a lowered position so as not to project in height much above the lateral drive systems 10A, 10B.

Specifically, advantageously, each lateral drive system 10A, 10B is connected to the internal combustion engine 9 by means of a belt drive assembly 11, which transmits the motion from the internal combustion engine 9 to each of the lateral drive systems 10A, 10B.

In other words, each lateral drive system 10A, 10B is operated by the internal combustion engine 9 by means of a belt drive assembly 11, thus of mechanical type, simple to manufacture, and having reduced weights and sizes.

Advantageously, the belt drive assembly 11 allows, with respect to the known operating systems of the rolling units 3A and 3B (of hydraulic or electronic type), a considerable reduction in the number of components that constitute the radio-controlled lawn mower 1, since the weight and the volume of the hydraulic or electric components traditionally used for operating the rolling units 3A and 3B are eliminated, with consequent reduction in weights and sizes.

Each drive system 10A, 10B comprises an electrically operated adjustment assembly 41, which can be operated by means of the remote control RC.

Advantageously, each drive system 10A, 10B is of the closed-circuit hydrostatic type.

According to the advantageous but non-exclusive embodiment illustrated in the accompanying figures (see in particular FIGS. 2 and 3), each of the drive systems 10A, 10B comprises an actuating element 27A, 27B and a rotary drive member 12A, 12B. Each rotary drive member 12A, 12B is integral to the respective actuating element 27A, 27B in order to cause its rotation during use.

Advantageously, but not constituting a limitation, the rotary drive member 12A, 12B and the respective actuating element 27A, 27B form a single body. In particular, each actuating element 27A, 27B is configured to receive rotational kinetic energy from the respective rotary drive member 12A and 12B.

More specifically, each actuating element 27A and 27B comprises a gearing (not illustrated), which operates in output a respective rolling unit 3A and 3B, and a hydraulic system (not illustrated) with piston pumps (not illustrated), which receives in input the kinetic energy from the respective rotary member 12A and 12B in order to transfer it to the gearing.

Each actuating element 27A, 27B comprises, in turn, an adjustment assembly 41A, 41B, which is configured to selectively vary the operation of the respective drive system 10A, 10B so as to adjust, accordingly, both the output speed and the output direction of rotation of the respective rolling unit 3A, 3B (see, for example, FIGS. 2 and 3). Advantageously, the adjustment assembly 41A, 41B comprises can bus electronics 45 (see FIGS. 2 and 4) preferably integrated, i.e. formed as a single body with each actuating element 27A, 27B. This allows eliminating the mechanical actuators used for operating the drive systems 10A, 10B in the known actuating systems (of hydraulic, or electronic, or mechanical type), with obvious advantages in terms of weights, sizes, as well as simplicity of manufacturing of the lawn mower 1. Advantageously, each drive system 10A, 10B is a known commercial product. With no loss of generality, the drive system 10A, 10B could be any drive system, preferably a closed-circuit hydraulic drive system with an integrated electric engine.

According to the illustrated example, each actuating element 27A, 27B is connected in a known manner to the drive wheel 6A, 6B of the respective rolling unit 3A, 3B in order to cause it to rotate around an axis transverse (in particular, perpendicular) to the vertical longitudinal reference plane S of the frame 2 (see, for example, FIG. 3).

Each actuating element 27A, 27B is caused to rotate, in use, by the internal combustion engine 9 by means of the belt drive assembly 11 and of the respective rotary drive member 12A, 12B, as illustrated in greater detail in the following.

According to what illustrated in the figures, the internal combustion engine 9 comprises a drive shaft 13 and each rotary drive member 12A and 12B is connected to such drive shaft 13 (see FIG. 7) by means of the belt drive assembly 11. According to the illustrated example, the drive shaft 13 rotates around a vertical rotation axis Z substantially perpendicular to the ground T.

The drive shaft 13 vertically projects underneath the internal combustion engine 9. This allows, advantageously, making the connections for transferring the motion to the drive systems 10A, 10B in a lowered area of the radio-controlled vehicle 1 and, therefore, having the internal combustion engine 9 positioned between the tracks 8A, 8B projecting in height in minimum part therefrom.

Figure 7:
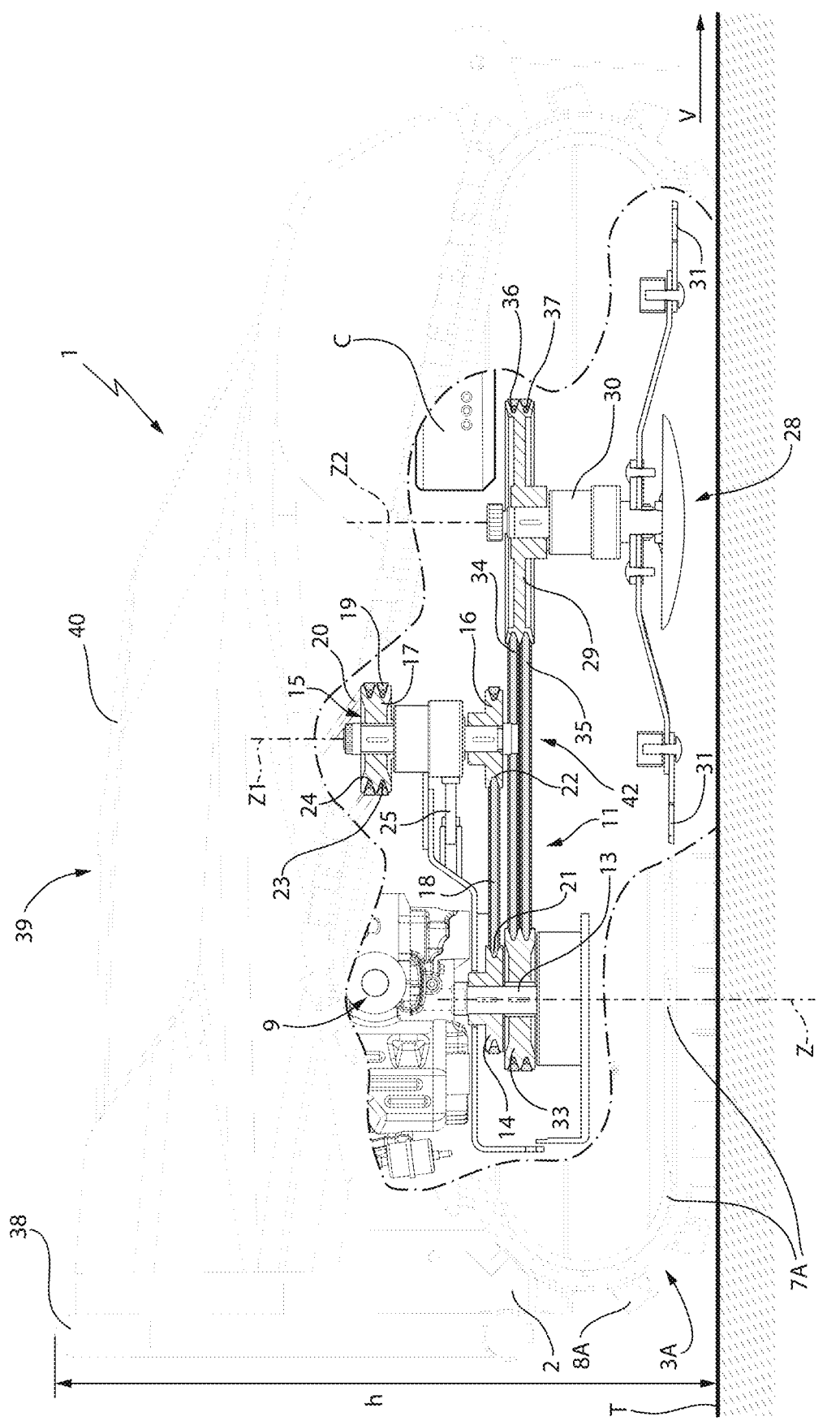
FIG. 7 is a schematic view, partially in longitudinal section, of the vehicle of FIG. 1 with some parts removed for the sake of clarity.

Advantageously, as illustrated schematically and in detail in FIG. 7, the belt drive assembly 11 comprises: a drive pulley 14, which is fitted around and is substantially concentric to the drive shaft 13; and a transmission member 15.

Advantageously, the transmission member 15 is installed in a central position with respect to the frame 2. The transmission member 15 is substantially vertical, i.e. perpendicular to the ground T, and can rotate around a vertical rotation axis Z1, substantially parallel to the drive shaft 13. Such arrangement of the transmission member 15, which is aligned (in particular with the axis Z1 aligned) with the drive shaft 13 along a direction parallel to the longitudinal axis X, in particular along the longitudinal axis X, allows obtaining a lower and more compact lawn mower 1, with respect to other known lawn mowers, with consequent advantages in terms of stability and of possibility of use also in areas that are arduous or difficult to reach with conventional lawn mowers, for example underneath rows.

As illustrated in the accompanying figures (see, for example, FIGS. 2, 3 and 7), the transmission member 15 comprises, in turn, a lower transmission pulley 16 and an upper transmission pulley 17. It is noted that the terms lower and upper are used with reference to the ground T.

The lower transmission pulley 16 and the upper transmission pulley 17 are integral to one another in the rotation around the vertical rotation axis Z1.

The belt drive assembly 11 comprises, according to the example illustrated in the figures, three belts 18, 19, 20 for transmitting the rotation of the drive shaft 13 to each rotary drive member 12A and 12B by means of the transmission member 15.

The belt 18 is fitted both around the drive pulley 14 and around the lower transmission pulley 16 of the transmission member 15 so as to transmit the motion from the drive shaft 13 to the transmission member 15.

The belt 19 is fitted both around the upper transmission pulley 17 of the transmission member 15 and around the right rotary drive member 12A so as to transmit the motion from the transmission member 15 to the right drive system 10A.

The belt 20 is fitted both around the upper transmission pulley 17 of the transmission member 15 and around the left rotary drive member 12B so as to transmit the motion from the transmission member 15 to the left drive system 10B.

Advantageously, the belt drive assembly 11 besides being a lot less bulky and heavy with respect to the hydraulic or electric drive systems used in the known radio-controlled vehicles (and in particular radio-controlled lawn mowers and ride-on lawn mowers) requires much less maintenance and is, in any case, much easier to manufacture and as to its maintenance.

Advantageously, the presence of the transmission member 15 in a central position allows vertically exploiting the space next to the internal combustion engine 9. This thus allows maintaining the internal combustion engine 9 in an extremely compact position substantially contained vertically within the size of the tracks 8A, 8B.

Advantageously, the transmission member 15 allows placing the upper transmission pulley 17 in a raised position, so as to be at the level of the drive wheels 6A and 6B, which are substantially raised with respect to the internal combustion engine 9. This allows maintaining the internal combustion engine 9 substantially recessed in height between the tracks 8A and 8B of the drive systems 10A and 10B.

In other words, the transmission member 15 allows making the lawn mower 1 extremely compact, i.e. with a reduced size in height.

Advantageously, the height h of the lawn mower 1 is lower than 1 metre. Preferably, the height h of the lawn mower 1 is lower than 80 centimetres.

Advantageously but not constituting a limitation, the belts 18, 19 and 20 are trapezoidal belts and the pulleys 14, 16 and 17 have, on their lateral surfaces, respective grooves (i.e., recesses) 21, 22, 23 and 24, which are advantageously V-shaped, for receiving the belts 18, 19 and 20.

The use of trapezoidal belts 18, 19 and 20 for the transmission allows obtaining the best compromise between traction, speed, tension on the supports and durability. The particular form of the V-shaped grooves 21, 22, 23 and 24 also provides greater protection against the radial sliding and causes the belts 18, 19 and 20 to settle even move in the grooves 21, 22, 23 and 24 of the corresponding pulleys 14, 16 and 17 when the transmitted tension increases, consequently increasing the friction and improving the transmission.

With particular reference to FIGS. 2, 3, 4, 5 and 7, the upper transmission pulley 17 comprises two grooves (i.e., recesses) 23 and 24, which are advantageously V-shaped.

As illustrated in FIG. 7, the upper groove 24 receives the belt 20, which then extends moving away from the rotation axis Z1 and leftwards with respect to the longitudinal axis X up to the left rotary drive member 12B.

Analogously, the lower groove 23 receives the belt 19, which extends moving away from the rotation axis Z1 and rightwards with respect to the longitudinal axis X up to the right rotary drive member 12A.

Alternatively, the transmission member 15 could comprise two pulleys, one for receiving the belt 19 and one for receiving the belt 20, instead of the single upper transmission pulley 17 having two grooves 23 and 24.

Advantageously but not necessarily, in order to allow the adjustment of the tensioning of the belts 18, 19 and 20, the transmission member 15 and the frame 2 are mutually movable, preferably along the longitudinal axis X. In particular, the transmission member 15 can slide with respect to the frame 2 and can be selectively positioned in a plurality of positions different from one another along the longitudinal axis X. Advantageously, by varying the distance between the transmission member 15 and the drive shaft 13, it is possible to selectively adjust the tractive force transmitted to the belts 18, 19 and 20.

With particular reference to FIGS. 4, 5, 8 and 9, the radio-controlled lawn mower 1 comprises at least one adjustment device 25, 25A, 25B, which is configured to move the transmission member 15 and the engine 9 with respect to one another along the longitudinal axis X.

Specifically, with particular reference to the embodiment illustrated in FIGS. 4 and 5, the radio-controlled lawn mower 1 comprises an adjustment device 25, which is connected to the transmission member 15 and is configured to move the transmission member 15 with respect to the engine 9, in particular with respect to the drive shaft 13 along a direction parallel to the longitudinal axis X of the radio-controlled lawn mower 1.

In the example illustrated in FIGS. 1 to 7 and in particular in FIGS. 4 and 5, the adjustment device 25 is an adjustment screw, which has a head 26 integral to the transmission member 15 and can be manually screwed/unscrewed in order to move the transmission member 15, consequently varying the tension of the belts 18, 19 and 20.

According to other embodiments not illustrated, the adjustment device 25 could be an oleodynamic/pneumatic cylinder, a slide system with a linear engine or any equivalent system.

Figure 8:
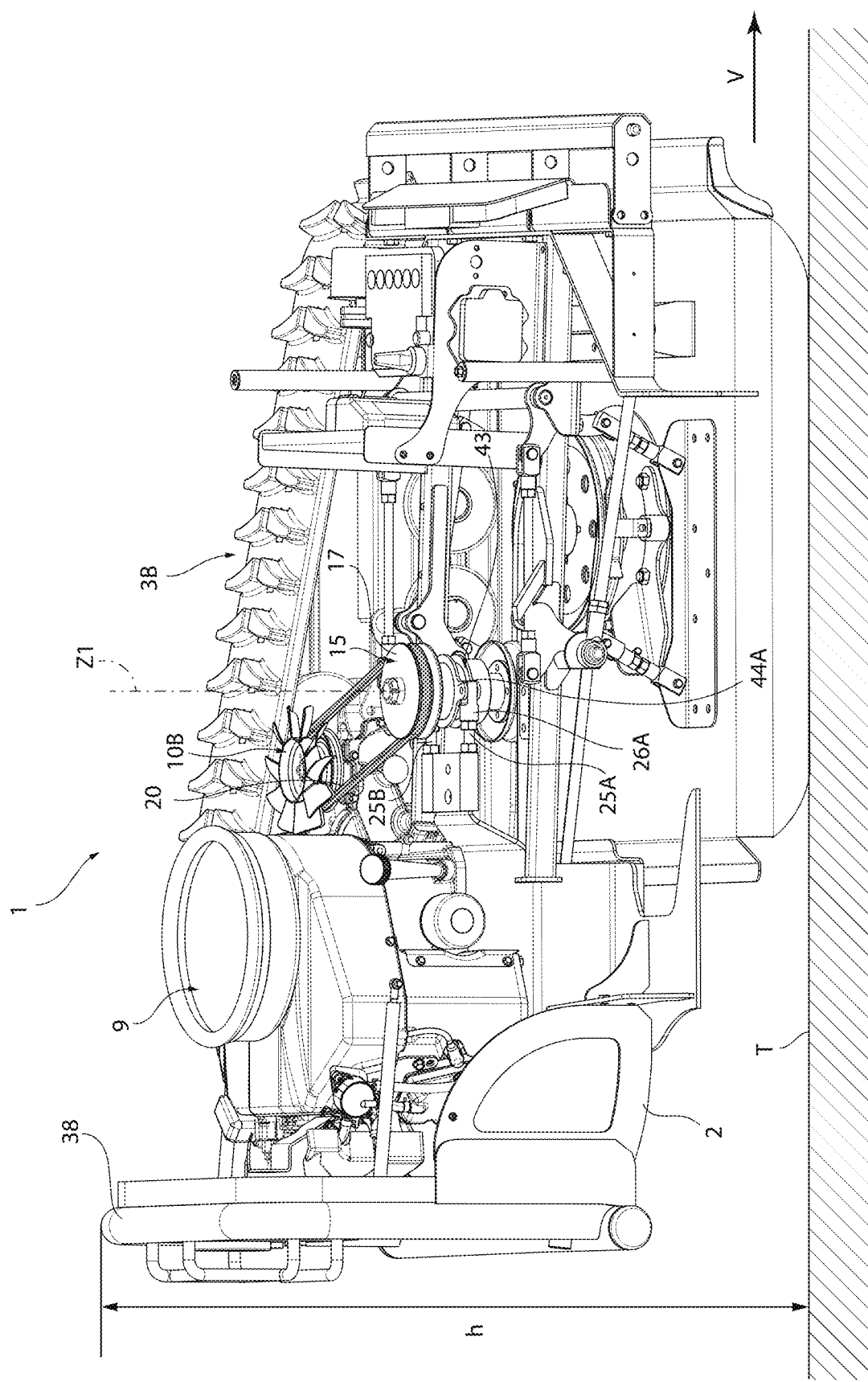
FIG. 8 is a side view of a radio-controlled vehicle according to a further embodiment of the present invention with some parts removed for the sake of clarity.
Figure 9:
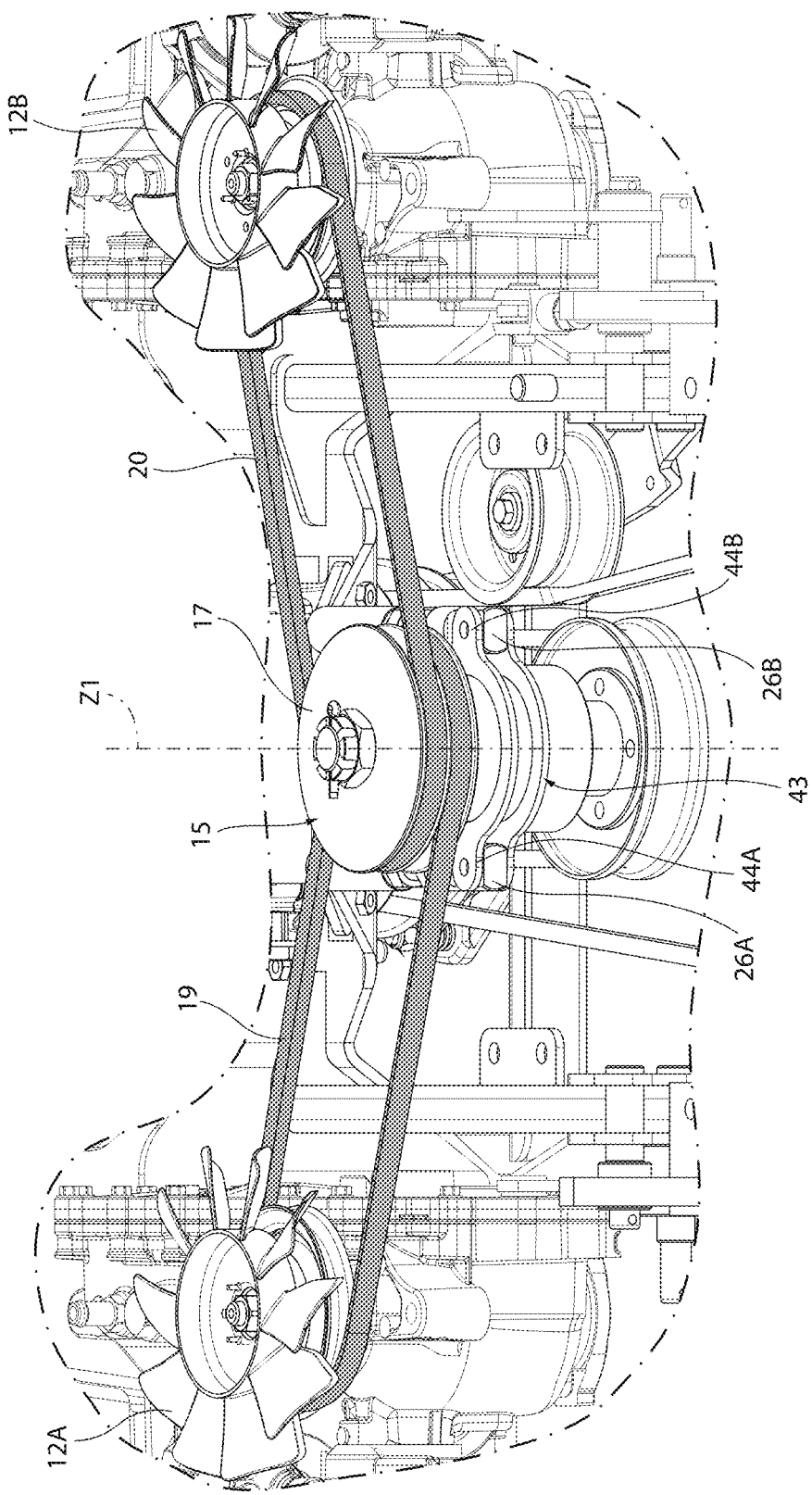
FIGS. 9 and 10 are two views on an enlarged scale and from two different perspectives of a detail of FIG. 8.
Figure 10:
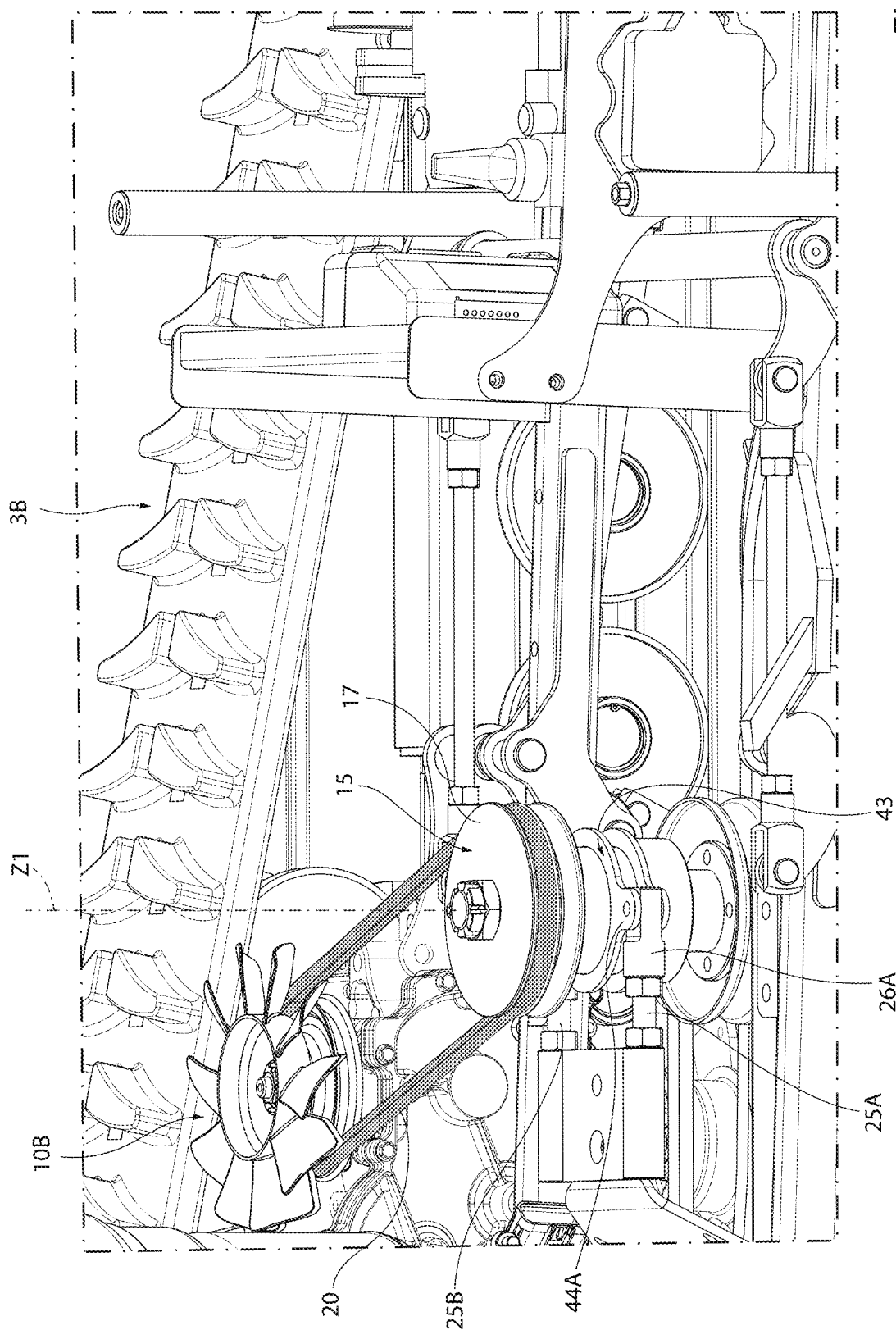

Alternatively, with particular reference to the embodiment illustrated in FIGS. 8, 9 and 10, the radio-controlled lawn mower 1 comprises a right adjustment device 25A and a left adjustment device 25B laterally connected to the transmission member 15 and configured to move the transmission member 15 with respect to the engine 9, in particular with respect to the drive shaft 13, along a direction parallel to the longitudinal axis X of the radio-controlled lawn mower 1.

Also in this case, each of the adjustment devices 25A, 25B can be an adjustment screw having a respective head 26A, 26B fixed to the transmission member 15 and can be screwed/unscrewed, for example manually, so as to move the transmission member 15, consequently varying the tension of the belts 18, 19 and 20. Advantageously but not constituting a limitation, in this case, the transmission member 15 comprises a connection ring 43 with two seats 44A and 44B each configured to receive the respective head 26A, 26B of the respective right or left adjustment device 25A, 25B.

The presence of two adjustment devices 25A, 25B allows improving the stability and the sturdiness of the lawn mower 1 (with respect to the case with only one adjustment device 25) and, at the same time, allows reducing the vibrations of the lawn mower 1 during use.

Moreover, thanks to the presence of two adjustment devices 25A, 25B, it will be possible to obtain a more accurate control of the tensioning of the belts 18, 19 and 20, acting on both sides of the transmission member 15.

Moreover, advantageously but not constituting a limitation, in this case, the two adjustment devices 25A, 25B can be adjusted, for example by screwing/unscrewing the respective heads 26A, 26B, independently of each other. This allows obtaining a different adjustment on the two sides of the transmission member 15, i.e. a different tensioning of the belt 19 and of the belt 20 in order to deal with possible anomalies that could arise, for example, due to an asymmetrical wear of the belts 19, 20 and/or due to the position of the engine 9 not perfectly centred.

Also in this case, two oleodynamic/pneumatic cylinders, two slide systems with a linear engine or any equivalent system could be used instead of adjustment screws.

Advantageously, the control unit C is connected to and exchanges signals with the internal combustion engine 9 and with each drive system 10A, 10B, in particular each adjustment assembly 41A, 41B.

Advantageously, an operator can operate each adjustment assembly 41A, 41B, and consequently each actuating element 27A, 27B, independently of one another by means of the user/operator interface UI.

This is useful, for example, in the case where the rolling unit 3A, 3B is a tracked undercarriage, since the variation of the direction of travel of the radio-controlled lawn mower 1 is obtained by varying the relative speed between the two rolling units 3A and 3B.

In this manner, advantageously, depending on the inputs entered by the user/operator (advantageously by means of the user/operator interface UI), each actuating element 27A, 27B can convey a different rotational speed to the drive wheel 6A and 6B, and therefore to the respective rolling unit 3A and 3B, thus determining the direction and the speed of travel of a respective side of the radio-controlled lawn mower 1.

In particular, the rotation of the radio-controlled lawn mower 1 is given by the difference of rotational speed of the drive wheels 6A and 6B. In other words, the drive wheels 6A and 6B are not steering, let alone pivoting. The fact that the radio-controlled lawn mower 1 is not steering, but that the direction of travel is given by the difference of operation of the rolling units 3A and 3B on each side, allows a greater grip and ensures the correct orientation of the radio-controlled lawn mower 1 on any type of ground T. Moreover, the presence of at least one drive wheel 6A and 6B on each side allows improving the grip, the towing force and, at the same time, the possibility of rotation of the radio-controlled lawn mower 1.

According to what illustrated, the radio-controlled lawn mower 1 further comprises a cutting unit 28 (of a known type) for mowing grass/shrubs/small tree trunks protruding from the ground T. The cutting unit 28 is mounted in a substantially central position of the lawn mower 1, and can be operated by the internal combustion engine 9.

According to what illustrated (see, for example, FIGS. 6 and 7), the cutting unit 28 comprises, in turn: a rotary body 29, which can rotate around a second rotation axis Z2, parallel to the drive shaft 13 and perpendicular to the ground T; a support 30, for example a hub, integral to the rotary body 29 and designed to support (in a known manner) the cutting bodies 31, in the illustrated case (see FIG. 6) a pair of blades, which can rotate around the axis Z2; and a cup-shaped cover 32, which has a concavity facing the ground T and is substantially coaxial to the rotation axis Z2 in order to protect the cutting unit 28 and contain any material which is radially tossed, in use, by the centrifugal force of the respective cutting bodies 31.

Advantageously, the cutting unit 28 is operated by the internal combustion engine 9 by means of another belt drive assembly 42. According to the embodiment illustrated in the accompanying figures (see in particular FIGS. 6 and 7), the radio-controlled lawn mower 1 (in particular, the belt drive assembly 42) comprises an electromagnetic clutch 33, which is splined to the drive shaft 13, in the illustrated case arranged below the pulley 14, and two belts 34 and 35 fitted around the electromagnetic clutch 33 and the rotary body 29 for operating the cutting unit 28. Also in this case, the belts 34 and 35 are trapezoidal belts and the rotary body 29 and the electromagnetic clutch 33 are provided, on their lateral surfaces, with respective grooves (i.e. recesses) 36 and 37, advantageously V-shaped, so as to receive such belts 34 and 35 (see in particular FIG. 7).

The presence of two belts 34 and 35 ensures greater safety in the transmission of the power from the internal combustion engine 9 to the cutting unit 28.

Advantageously, the internal combustion engine 9 is a petrol engine with a horsepower equal to or more than 20, therefore the presence of both belts 34 and 35 ensures the transmission of the torque with greater safety. Moreover, the presence of two belts 34 and 35 ensures that, in the case where one of the two belts 34 and 35 should accidentally be uncoupled from the rotary body 29, for example when working on an arduous ground T, the functionality of the cutting unit 28 is not lost, improving the reliability of the radio-controlled lawn mower 1.

It is understood that the internal combustion engine 9 could also be run on diesel or the like.

Advantageously, as partly visible in FIGS. 2 and 4, the radio-controlled lawn mower 1 comprises a fan (not visible in the accompanying figures) for cooling the internal combustion engine 9, and a rollbar 38 configured to protect the internal combustion engine 9 and the fan from external blows.

The radio-controlled lawn mower 1 further has a liftable casing 39 which is configured to cover, in use, at least the internal combustion engine 9, the drive systems 10A and 10B and the belt drive assembly 11, defining an outer upper surface 40 of the radio-controlled lawn mower 1 which is continuous and has a concavity facing downwards. In other words, the casing 39 of the radio-controlled lawn mower 1 is closed by a continuous upper surface 40.

The radio-controlled lawn mower 1 does not provide for cabs or any other types of stations for the operator.

Advantageously, the lawn mower 1, in particular the casing 39, does not have any seats or compartments for an operator since the presence of the operator on board the lawn mower during use is not provided for. This allows having a radio-controlled 1 lawn mower with a simpler and more compact structure, besides having a reduced size.

In this regard, advantageously, the radio-controlled lawn mower 1 has an entire configuration, i.e. a combination between the arrangement of the components such to reduce the sizes and lower the position of the internal combustion engine 9 and of all the components in general, with respect to vehicles of traditional type, so as to increase the stability of the radio-controlled vehicle 1, by lowering the position of the centre of gravity of the radio-controlled lawn mower 1.

Advantageously, the radio-controlled lawn mower 1 is compact, i.e. has a reduced height with respect to other types of known lawn mowers. In particular, the lawn mower 1 has a height lower than 1 metre, preferably lower than 80 centimetres.

In use, the radio-controlled lawn mower 1 is operated by the internal combustion engine 9 and is controlled by a user/operator by means of the remote control RC. This allows a user/operator to control the lawn mower 1 from a position that is physically far from the lawn mower 1. This is particularly advantageous when working on particularly arduous grounds T, for example with steep slopes, since it allows carrying out work in total safety since the user/operator does not even approach such areas.

Advantageously, by means of the remote control RC, the user/operator is able to directly adjust each drive system 10A, 10B, determining the movements of the lawn mower 1.

The above-described radio-controlled lawn mower 1, thanks to the particular drive assembly 11, allows a considerable reduction in weights and sizes with respect to the traditional lawn mowers.

Moreover, the mounting (if necessary, the replacing) and the maintenance of the elements of the belt drive assembly 11 of the radio-controlled mower 1 are simple, with respect to the hydraulic drive systems traditionally used.

Advantageously, the fact that the drive assemblies 11 and 42 are of the belt type allows varying the transmission ratio between the two systems in a simple manner modifying the size of the drive pulleys 14, 34 and/or of the pulleys 16 and 17 of the transmission member 15 and/or of the rotary body 29.

The invention claimed is:

1. A radio-controlled vehicle comprising: a frame; an engine; one or more rolling units to cause the radio-controlled vehicle, in use, to move on a ground; a drive system for each respective rolling unit; a remote control; a control unit, which exchanges signals with the remote control, the engine and each drive system; the radio-controlled vehicle comprising a belt drive assembly interposed between said engine and each drive system; wherein said belt drive assembly is operated by said engine and causes the rotation of each drive system;

the engine comprising a drive shaft having a first vertical rotation axis, which is substantially perpendicular to the ground; the drive shaft vertically projecting downwards from the engine;

the belt drive assembly comprising:
a first drive pulley, which is fitted around said drive shaft;
a transmission member, which can rotate around a second axis, which is parallel to said first axis; the transmission member comprising, in turn, a first transmission pulley and a second transmission pulley, which are integral to one another and can rotate around the second rotation axis;
a first belt, which is fitted both around said first drive pulley and around said first transmission pulley so as to transmit the motion from the drive shaft to said transmission member;

a second belt, which is fitted both around said second transmission pulley and around a first rotary drive member so as to transmit the motion from said first transmission member to a first drive system; and a third belt, which is fitted both around said second transmission pulley and around a second rotary drive member so as to transmit the motion from said transmission member to a second drive system;

wherein said second transmission pulley is vertically above said first transmission pulley.

2. A radio-controlled vehicle according to claim 1, wherein the transmission member, which receives the motion from said engine and transmits it to each drive system, is installed in parallel to said engine along a longitudinal axis of the radio-controlled vehicle.

3. A radio-controlled vehicle according to claim 2 and comprising at least one adjustment device, which is configured to move one relative to the other said transmission member and the engine along the longitudinal axis.

4. A radio-controlled vehicle according to claim 1, wherein said second transmission pulley comprises two grooves to receive said second belt and said third belt, respectively.

5. A radio-controlled vehicle according to claim 1 and comprising a first and a second rolling unit; wherein each rolling unit comprises at least one respective drive wheel; each drive system operating, in use, the drive wheel of the respective rolling unit; each drive system comprising a respective rotary drive member, which is caused to rotate by said engine by means of the belt drive assembly.

6. A radio-controlled vehicle according to claim 1, and comprising:

a cutting unit, which can be operated by said engine, said cutting unit comprising, in turn, a rotary body, which can rotate around a second rotation axis, which is parallel to said drive shaft, and a support, which is integral to said rotary body so as to support at least one cutting body;

an electromagnetic clutch, which is splined to said drive shaft; and at least one fourth belt, which is fitted both around said electromagnetic clutch and around said rotary body so as to operate said cutting unit.

7. A radio-controlled vehicle according to claim 6 and comprising: a fifth belt, which is fitted both around said electromagnetic clutch and around said rotary body; said electromagnetic clutch and said rotary body comprising two grooves so as to receive the fourth belt and the fifth belt, respectively.

8. A radio-controlled vehicle according to claim 1, wherein each drive system comprises an electrically operated adjustment assembly, which can be operated by means of the remote control.

9. A radio-controlled vehicle according to claim 8 wherein each drive system is a closed-circuit hydrostatic drive system, and each electrically operated adjustment assembly comprises can bus electronics.

10. A radio-controlled vehicle according to claim 1, wherein each rolling unit comprises tracks.

11. A radio-controlled vehicle according to claim 1 and comprising a liftable casing, which is configured to cover, in use, at least said engine, said drive systems and said belt drive assembly; said liftable casing defines an outer upper surface of the radio-controlled vehicle, which is continuous and has a concavity facing downwards; wherein the height, namely the size along an axis that is perpendicular to the ground, of the vehicle is smaller than 1 metre.

* * * * *